US008555186B2

(12) United States Patent
Sahai et al.

(10) Patent No.: US 8,555,186 B2
(45) Date of Patent: Oct. 8, 2013

(54) INTERACTIVE THUMBNAILS FOR TRANSFERRING CONTENT AMONG ELECTRONIC DOCUMENTS

(75) Inventors: Ganesh Sahai, Noida (IN); Anmol Dhawan, Ghaziabad (IN); Sachin Gaur, Ghaziabad (IN); Sachin Soni, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 991 days.

(21) Appl. No.: 11/801,242

(22) Filed: May 8, 2007

(65) Prior Publication Data
US 2011/0185314 A1 Jul. 28, 2011

(51) Int. Cl.
G06F 15/00 (2006.01)
G06F 3/048 (2013.01)
(52) U.S. Cl.
USPC ............................ 715/770; 715/838; 715/788

(58) Field of Classification Search
USPC .......................................... 715/838, 770, 788
See application file for complete search history.

(56) References Cited

U.S. PATENT DOCUMENTS

| | | | |
|---|---|---|---|
| 6,773,177 B2 | 8/2004 | Denoue et al. | |
| 6,912,690 B2 | 6/2005 | Bauchot | |
| 6,944,821 B1 | 9/2005 | Bates et al. | |
| 7,392,475 B1 * | 6/2008 | Leban et al. | 715/255 |
| 2005/0149848 A1 | 7/2005 | Broman et al. | |
| 2005/0149871 A1 | 7/2005 | Broman et al. | |
| 2005/0177573 A1 * | 8/2005 | Gauthier et al. | 707/10 |
| 2005/0179655 A1 | 8/2005 | Ludwig | |
| 2005/0203935 A1 | 9/2005 | McArdle | |
| 2006/0159345 A1 * | 7/2006 | Clary et al. | 382/186 |
| 2008/0201656 A1 * | 8/2008 | Kim et al. | 715/770 |
| 2009/0179998 A1 * | 7/2009 | Steinberg et al. | 348/222.1 |

* cited by examiner

Primary Examiner — Andrea Leggett
(74) Attorney, Agent, or Firm — Finch & Maloney, PLLC

(57) ABSTRACT

Embodiments of the invention relate generally to computing devices and systems, software, computer programs, applications, and user interfaces, and more particularly, to generating a reproduction of an electronic document, such as a thumbnail, that includes an input field.

31 Claims, 11 Drawing Sheets

INTERACTIVE THUMBNAILS FOR TRANSFERRING CONTENT AMONG ELECTRONIC DOCUMENTS

FIELD OF THE INVENTION

Embodiments of the invention relate generally to computing devices and systems, software, computer programs, applications, and user interfaces, and more particularly, to generating a reproduction of an electronic document, such as a thumbnail, that includes an input field.

BACKGROUND OF THE INVENTION

Traditional user interfaces typically provide users with interface elements and devices to copy content, for example, from one electronic document for pasting into another electronic document. One common technique for copying content requires a user to select the content (e.g., text) from a source electronic document generated by one application, such as a word processing application, perform a copy command, and then transition to a destination electronic document generated by either the same or a different application to paste the content. Generally, the source and destination documents are in separate windows. While functional, there are certain drawbacks to current techniques for copying content.

FIG. 1 depicts an interface 100 providing for a common window implementation scheme normally used to facilitate traditional copying techniques. In a typical copying operation, a destination window 102 presents a user with an electronic document ("edoc") 103 having one or more fields in which to enter content, such as field ("1") 104, field ("2") 106, and field ("3") 108. Next, consider that the user wishes to copy and paste content into fields 104, 106, and 108 that originates from source window 112, source window 122 and source window 132, respectively, which, in turn, include content 110, content 120 and content 130. As FIG. 1 shows, window 102 transitions to window 112 so that the user can select content ("Content 1B") 114. Typically, the user implements a pointing cursor and a pointing device, such as a mouse, to select content 114. Then, the user normally performs a general "copy" command, such as activated by a menu or by one or more keyboard keys (e.g., CONTROL and C keys). Subsequently, window 112 transitions back to window 102 so that the user can perform a general "paste" command to copy the selection into field 104. If the user wishes to continue copying from different sources, the user continues transitioning back-and-forth between window 102 and window 122 as well as between window 102 and window 132 until content ("Content 2B") 124 and content ("Content 3B") 144 are pasted in field 106 and field 108, respectively. In some window presentation schemes, windows 102, 112, 122, and 132 are different windows, whereas in other schemes they are the same window.

Therefore, current window presentation schemes often require a user to experience numerous transitions between destination windows and source windows to populate information into fields 104, 106, and 108. Often, source windows 112, 122, and 132 obscure each other as well as destination windows 102. In some cases, a user might be required to expend time to open another window, as well as an application, to present content in a source window. Further, the user might be required to perform a command to identify the particular window that will be the recipient of the copied content. Accordingly, the current requirements to copy content can hinder the copying process.

It would be desirable to provide improved techniques, systems and devices that minimize one or more of the drawbacks associated with conventional techniques for copying content.

BRIEF DESCRIPTION OF THE FIGURES

The invention and its various embodiments are more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION

Figure 1:
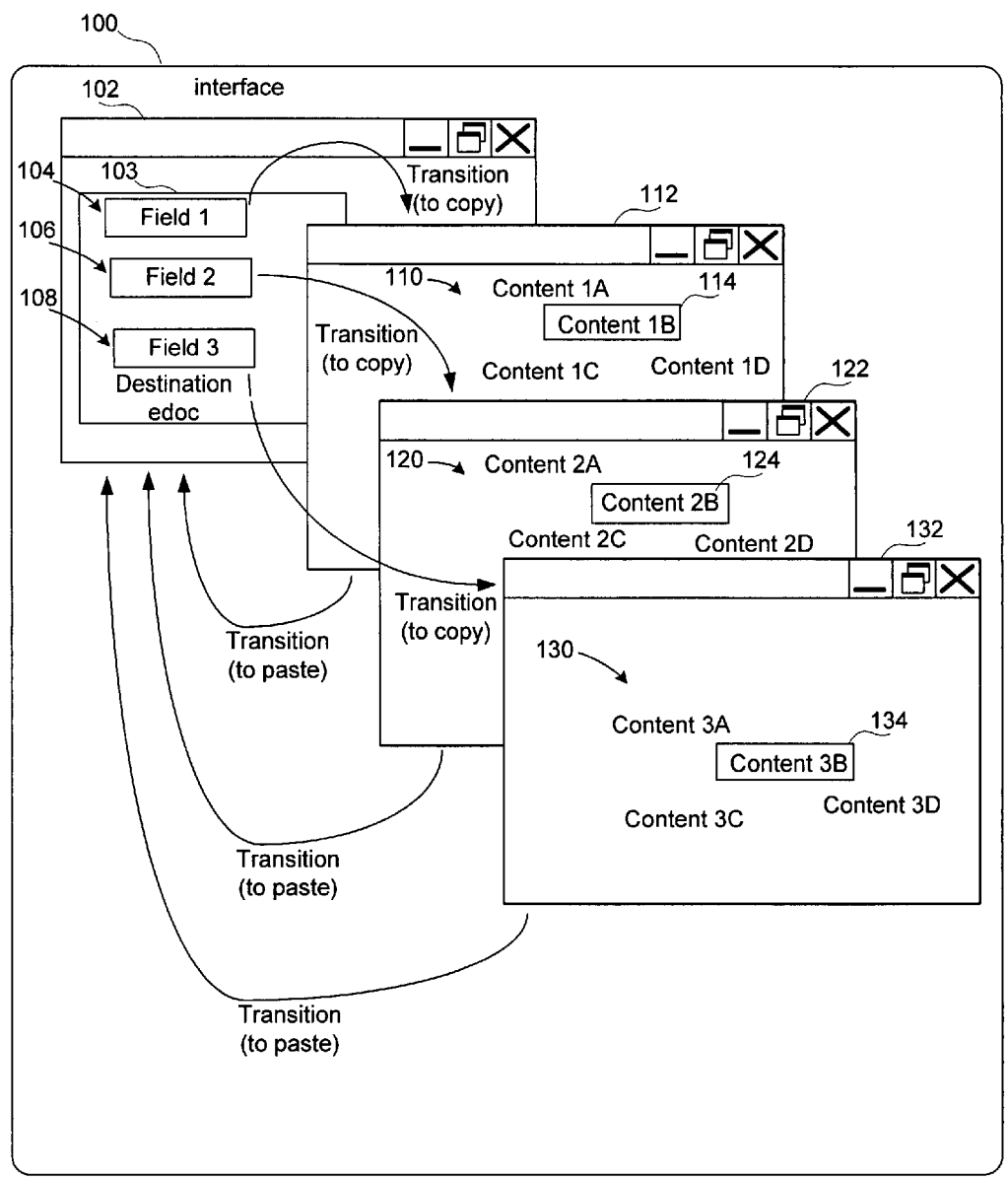
FIG. 1 depicts an interface providing for a common window implementation scheme normally used to facilitate traditional copying techniques.
Figure 2A:
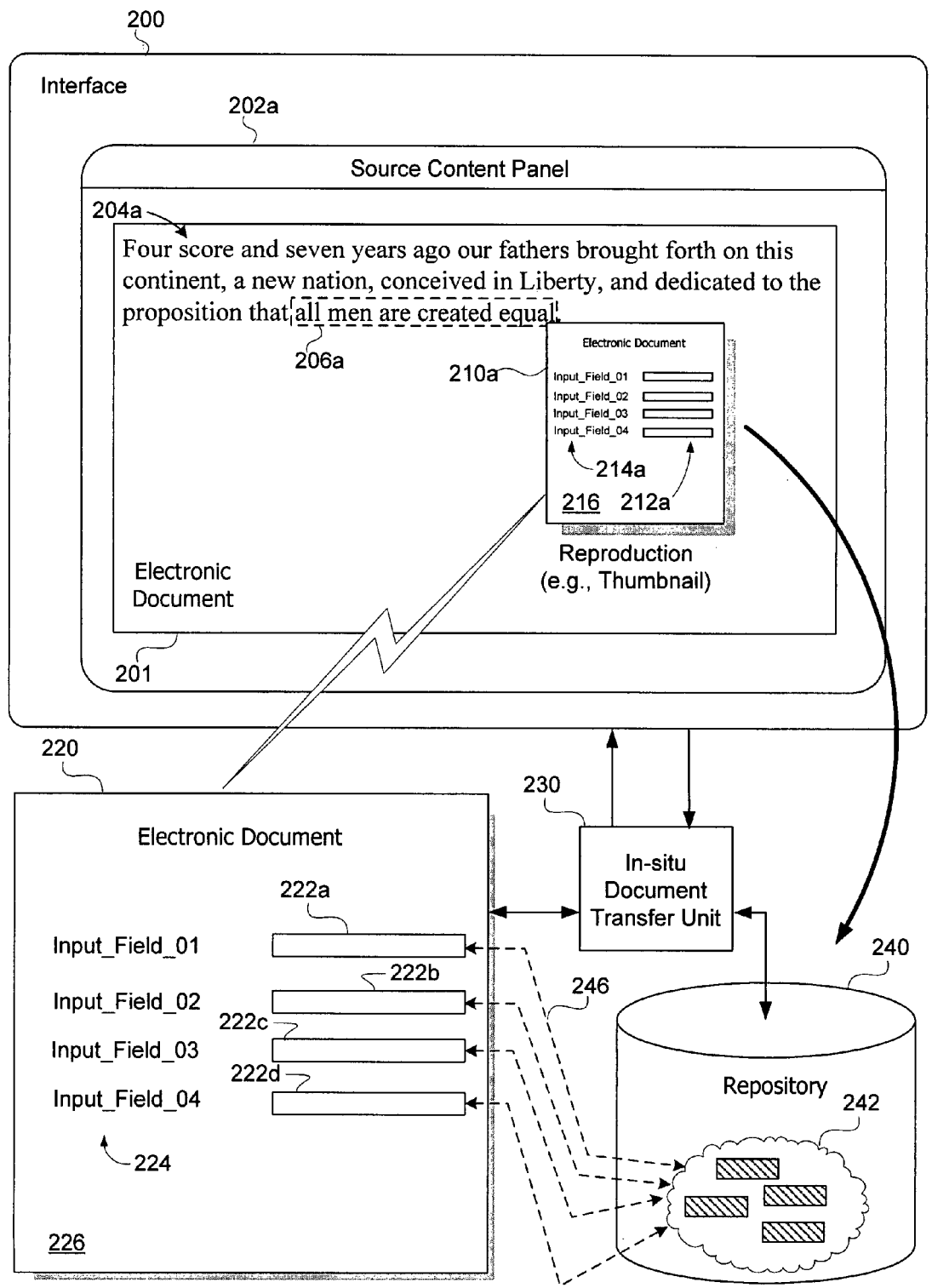
FIG. 2A is a diagram of an interface implementing a reproduction of an electronic document that is configured to transfer content from a source content panel, according to at least one embodiment of the invention.

FIG. 2A is a diagram of an interface implementing a reproduction of an electronic document that is configured to transfer content from a source content panel, according to at least one embodiment of the invention. Interface 200 is configured to provide a reproduction 210a of an electronic document 220, with reproduction 210a including one or more input fields 212a that are linked to a storage, such as a repository 240, for electronic document 220. For example, input fields 212a can be configured to transfer content (or portions thereof), such as content portion 206, from a source content panel 202a to memory locations 242 that are otherwise configured to receive content from fields 222a, 222b, 222c, and 222d, all of which are associated with electronic document 220. In one embodiment, reproduction 210a is presented in interface 200 as a miniaturization of electronic document 220. In at least one embodiment, reproduction 210a is presented in source content panel 202a in response to the invocation of a command to paste selected content portion 206 into a specific input field 212a of a specific electronic document. Thus, reproduction 210a facilitates content transfer without significant interruption to the process of transferring content, for example, from a source electronic document 201 that contains content 204a.

In view of the foregoing, reproduction 210a obviates transitioning between source content panel 202a and electronic document 220, which can be in another panel (not shown) during the content transfer process, according to one embodiment. A user thus can access repository 240 via reproduction 210a to store content portion 206a without using a pointing device (e.g., a mouse) to select another panel, for example, by moving a pointer cursor over the other panel and "clicking" on a left button on a mouse. As such, reproduction 210a promotes effective copying and pasting processes by reducing disruptions that generally arise from transitioning among multiple panels. In some instances, repository 240 can be implemented as a buffer, a database, or any other type of memory. Further, reproduction 210a need not be rendered in a panel separate from source content panel 202, which, in turn, reduces and/or eliminates instances in which the multiple panels might obscure each other. In at least one embodiment, reproduction 210a provides access to repository 240 without opening an application to generate electronic document 220 that otherwise might be required to transfer content. As such, reproduction 210a can reduce computational overhead (e.g., processor cycles, memory usage, etc.) that otherwise would be necessary to support opening the application to implement the functionality of electronic document 220. In another embodiment, interface 200 is configured to implement a specialized command that performs at least the following two or more actions: (1) initiating a copying operation to copy content portion 206a, (2) determining the destination, such as a destination electronic document, for receiving content portion 206a, and (3) pasting content portion 206a. As such, a user need not rely on using separate commands to generically copy content, to generically paste content, or to select a destination panel in which to paste the content. This provides for an expedited content transfer process.

In accordance with at least one embodiment, an in-situ document transfer unit 230 can be configured to generate reproduction 210a as an in-situ representation of electronic document 220 within the context of electronic document 201, thereby enabling a user to select a destination for transferring content thereto, coincident to (or substantially coincident to) the presentation of source content 204a and/or source content panel 202a. In one embodiment, electronic document 220 can include one or more editable portions, such as fields 222a to 222d, and one or more non-editable portions 226, which can include graphics or text, such as input field indicia 224, which can describe the editable portions. In at least one instance, in-situ document transfer unit 230 can reduce the sizes of elements constituting either the editable portions or the non-editable portions, or both, of electronic form 220 to form miniaturized non-editable portion 216 and miniaturized editable portions 212a of reproduction 210a. In at least one specific embodiment, an editable portion is a portion of reproduction 210a that a user can edit to enter content as input, the editable portion being linked to a storage, whereas a non-editable portion is not linked to a storage, at least for the purposes of transferring content.

Examples of such elements include, among other things, images (e.g., as represented by a bitmap, JPEG files, MPEG, or the like), non-editable text for describing input fields (e.g., text for input field indicia 224), non-editable input field features, such as the size of the one or more text boxes associated with input fields 212a, as well as editable input features, such as the text that a user can enter as an input. A text box is an element of a graphical user interface, such as interface 200, that allows a user to input information to be used, for example, by an application program. As such, in-situ document transfer unit 230 can operate to reduce the sizes of input field indicia 224 and fields 222 to respectively form miniaturized input field indicia 214a and input fields 212a for reproduction 210a. In one embodiment, in-situ document transfer unit 230 produces reproduction 210a as a thumbnail.

Further, in-situ document transfer unit 230 can be configured to establish links between input fields 212a and memory locations 242. Accordingly, a user can copy content portion 206a and paste it in one of input fields 212a to store content portion 206a in a memory location 242, which also is configured to receive content from one of fields 222, such as field ("Input_Field_02") 222b. Thus, in-situ document transfer unit 230 can operate to accept the selection of one of input fields 212a, and to identify a corresponding memory location 242 in repository 240 that has an association 246 with a field in electronic document 220. Continuing with the previous example, consider that the next time the application for electronic document 220 is activated (if the application was inactive during the content transfer process), field 222b will include content portion 206a.

As used herein, the term "reproduction" refers generally, at least in one embodiment, to an interface component that is an in-situ representation of an electronic document that is presented in the context of performing a content transfer operation (e.g., a consolidated copy-and-paste function) within or in association with a source (or a destination) electronic document. A reproduction provides for in-situ data transfer by enabling the copying-and-pasting operation to be performed in association with the same, original panel without transitioning away, for example, from the source content being presented at its panel. In particular, a reproduction can include one or more input fields that provide functionality that is equivalent to that of the input fields for the electronic document that the reproduction represents.

In one embodiment, a reproduction is an interactive thumbnail that includes a thumbnail image of an electronic document and interactive features, such as input fields. A thumbnail image of an electronic document and interactive features, including input fields, can be referred to either a "thumbnail" or an "interactive thumbnail," according to various embodiments of the invention. As used herein, the term "input field" refers generally, at least in one embodiment, to a data field that accepts content, such as text, in real-time (or substantially in real-time) in association with the electronic form for which the reproduction is created. As used herein, the term "specialized command" refers generally, at least in one embodiment, to a command that initiates, when executed, a content transfer operation using an interactive thumbnail. An example of a specialized command is a command that performs a consolidated copy-and-paste function among, for example, electronic documents.

As used herein, the term "content," at least in one embodiment, refers to information and/or material presented within an interface in relation to, for example, the audio and/or visual presentation of text, such as an electronic document (e.g., a document in Portable Document Format ("PDF")), as well as audio, images, audio/video media, such as Flash® presentations, text, and the like. As used herein, the term "panel," at least in one embodiment, can refer to displays, palettes, tabs, windows, screens, portions of an interface, and the like. As used herein, the term "electronic form," can refer, at least in one embodiment, to an interactive form having data input fields, including a content input field for entering content. In one embodiment, each of the data input fields of a reproduction of an electronic document is implemented in a single panel. In other embodiments, the data input fields for the electronic form can be distributed over multiple panels. An electronic form can be an electronic document, according to some embodiments. As used herein, the term "electronic document," can refer, at least in one embodiment, to any data files (e.g., other than computer programs or system files) that are intended to be used in their electronic form, without necessarily being printed, whereby computer networks and electronic display technologies can help facilitate their use and distribution. Note that an electronic document can itself be defined as content, at least in one embodiment. Examples of an electronic document include a document produced by a word processing application, a document in Portable Document Format ("PDF"), and the like.

Figure 2B:
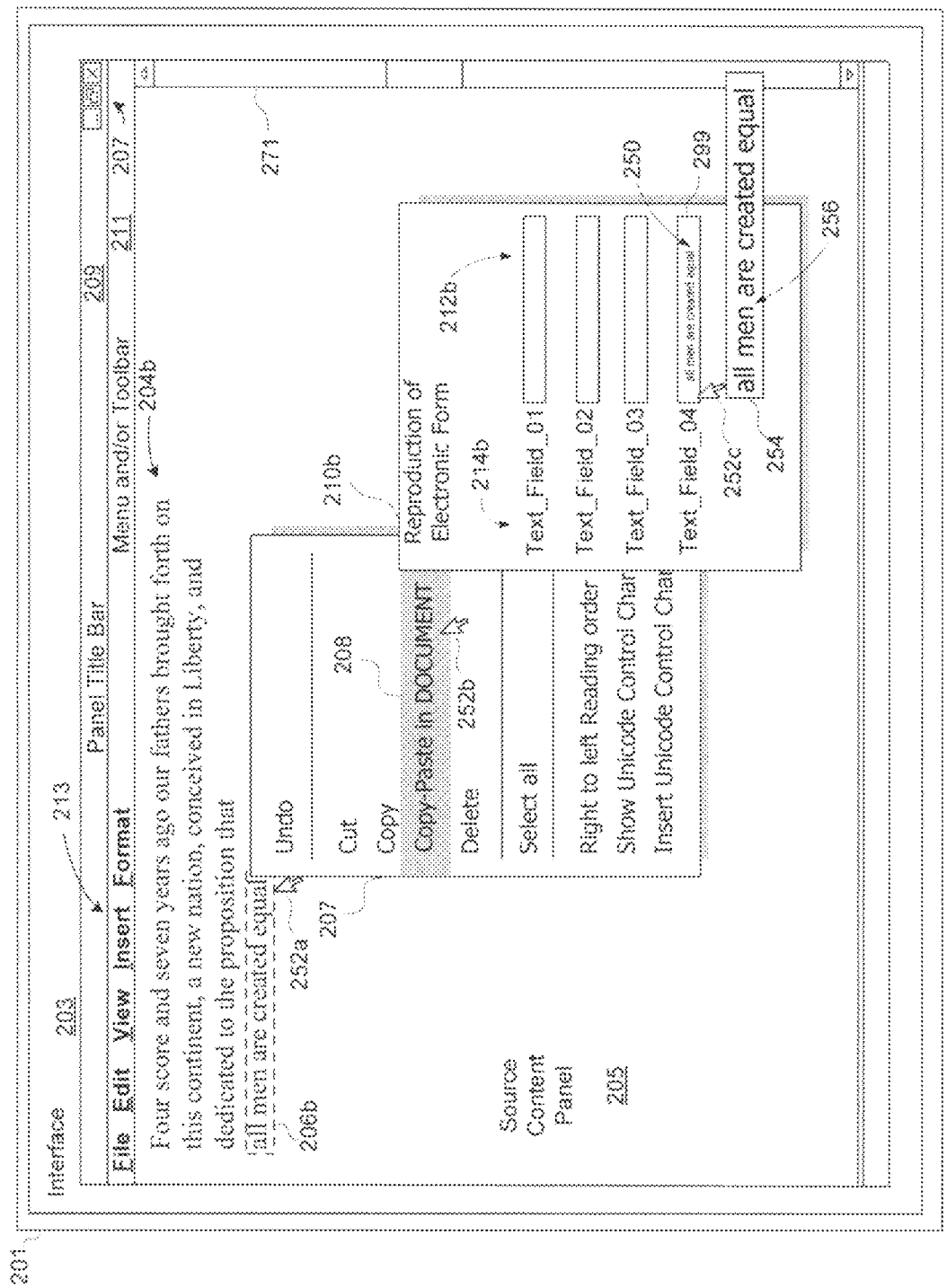
FIG. 2B is a diagram depicting the presentation of a specialized command for implementing a reproduction of an electronic document, according to at least one embodiment of the invention.

FIG. 2B is a diagram depicting the presentation of a specialized command for implementing a reproduction of an electronic document, according to at least one embodiment of the invention. In this example, a display 201 is configured to provide an interface 203, which, in turn, is configured to display a source content panel 205 for presenting content 204b from which to copy and paste into an electronic form (not shown), in response to the execution of, for example, a specialized command that performs copying and pasting. Source content panel 205 includes a panel title bar 209, which can indicate the file name for a source electronic document, a menu and/or toolbar 211, which is shown to include at least menu items 213, panel control buttons 207, scroll bar 271, and content 204b.

To illustrate the implementation of a reproduction for transferring content, consider that a user selects a portion of content as content portion 206b for transference into an electronic document that can be, for example, in another panel (not shown) or associated with an unopened application. The user can select content portion 206b using, for example, a pointer cursor 252a responsive to a user's input into a pointing device, such as mouse. A user next can invoke a specialized command that initiates a copying operation to copy content portion 206b, and determines the destination electronic document (not shown) as recipient of content portion 206b. In one instance, a menu 207 is presented responsive, for example, to the selection of content portion 206b or a user input (e.g., by right-clicking a right-button of a mouse). In one embodiment, the user activates the specialized command by at least causing pointer cursor 252b to hover over indicia 208 that describes the specialized command, such as a "Copy-Paste in DOCUMENT" command. Thus, indicia 208 can provide for the transfer of content portion 206b into an input field. In other embodiments, other indicia (not shown), similar to indicia 208, can be implemented to present one or more interactive thumbnails for multiple destination electronic documents.

Activation of the specialized command—in whole or in part—causes a reproduction 210b of an electronic form to appear in interface 203. Reproduction 210b includes indicia 214b indicating that input fields 212b are text fields, in this example. To complete the content transfer process, the user can select one of the input fields 212b, such as input field 299, into which content portion 206b is to be pasted. For example, the user can move pointer cursor 252c to hover over input field 299, which is shown as "Text_Field_04." In parallel to selecting input field 299, the execution of the specialized command causes the pasting of content portion 206b into input field 299, which is shown as text 250, thereby completing the execution of the specialized command. Optionally, the specialized command can operate to refresh input field 229 to include the pasted information as part of a refreshed reproduction 210b.

Note that in at least one embodiment, input field 299 can be a miniaturized counterpart of a field (not shown) for the electronic document. As such, text 250 can be of a reduced size that might not readily be readable. As such, interface 203 can present enlarged text 256 in an enlarged content portion 254 for enhanced readability. In one embodiment, enlarged content portion 254 can be implemented as a tool tip, which is a graphical user interface element, such as a box of information, that appears when a pointer cursor is placed over an item. Thus, when pointer cursor 252c moves over input field 299, enlarged content portion 254 will be visible as long as pointer cursor 252c remains over input field 299.

Figure 2C:
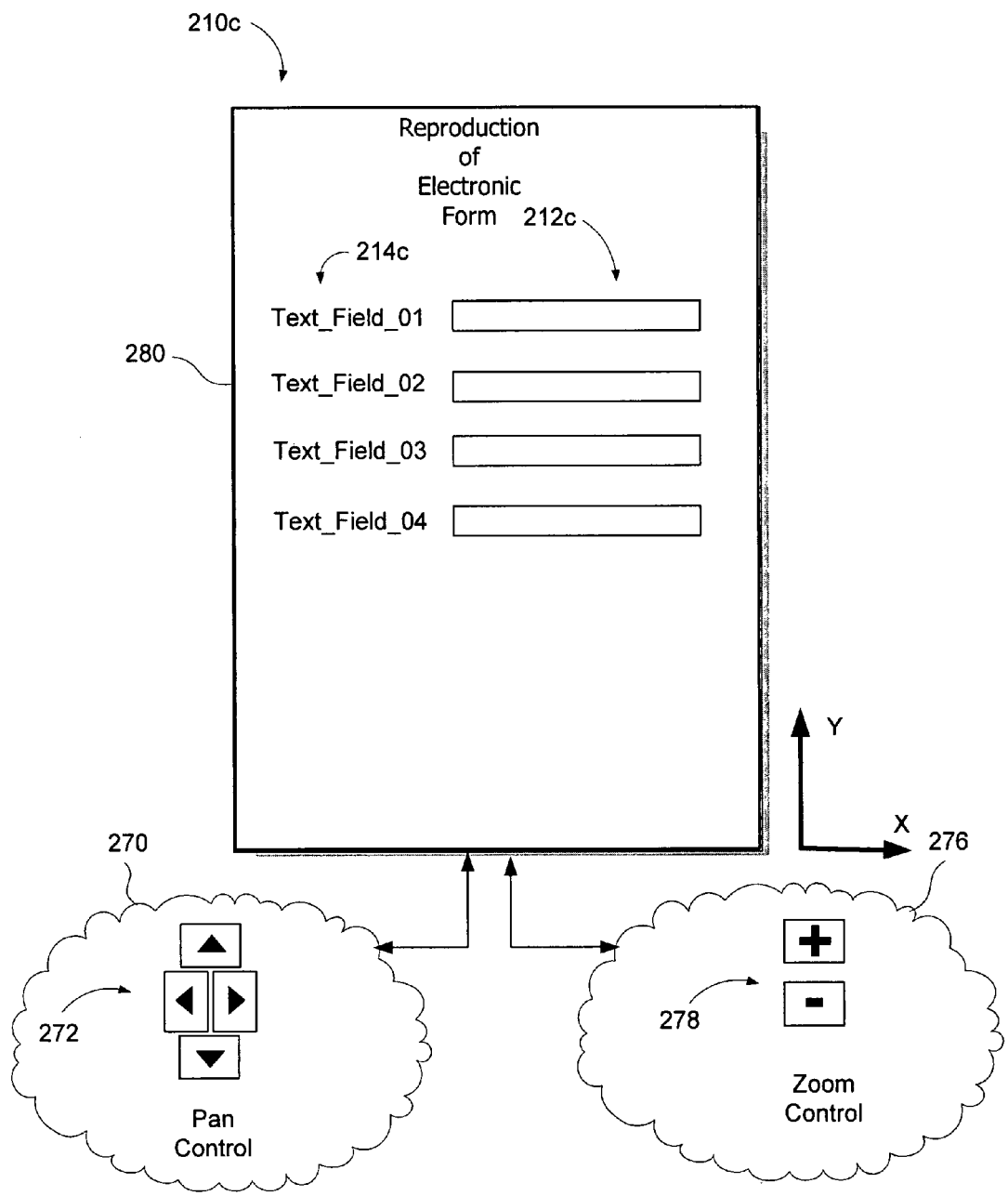
FIG. 2C is an illustration of examples of control interfaces for manipulating a reproduction of an electronic form, according to at least one embodiment of the invention.

FIG. 2C is an illustration of examples of control interfaces for manipulating a reproduction of an electronic form, according to at least one embodiment of the invention. In this example, thumbnail 210c can be configured to modify the presentation of indicia 214c and content in input fields 212c within a thumbnail boundary 280. In one embodiment, an interface (not shown) can be configured to present a user with a pan control interface 270, such as pan control buttons 272, to move indicia 214c and input fields 212c relative to thumbnail boundary 280 (e.g., in the X and Y directions). In another embodiment, the interface can also be configured to present a user with a zoom control interface 276, such as zoom control buttons 278, to zoom in and zoom out to increase and decrease, respectively, the sizes of indicia 214c and input fields 212c, relative to thumbnail boundary 280.

Figure 3:
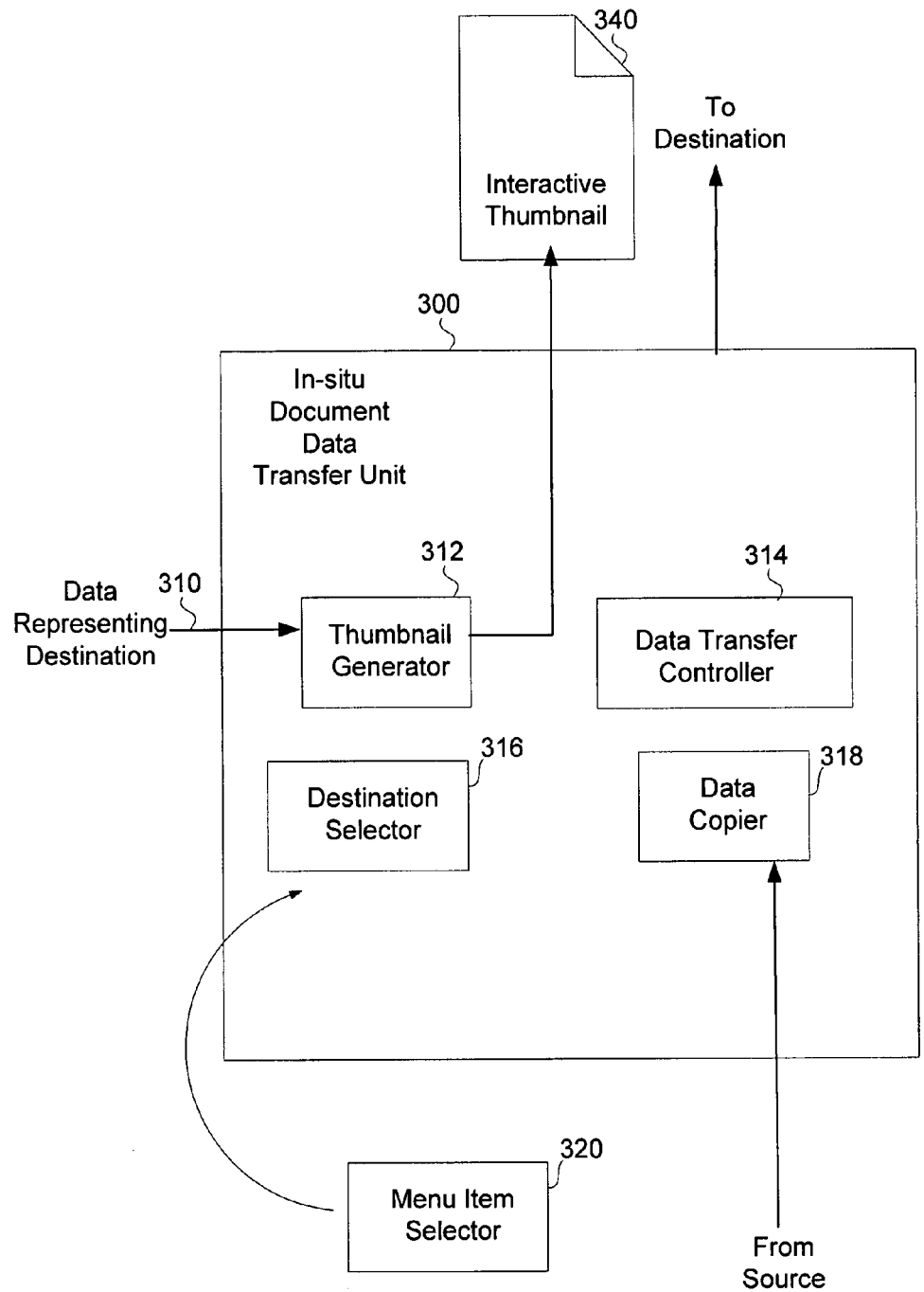
FIG. 3 is a diagram of an in-situ document transfer unit, according to at least one embodiment of the invention.

FIG. 3 is a diagram of an in-situ document transfer unit, according to at least one embodiment of the invention. In particular, FIG. 3 illustrates in-situ document transfer unit 300 being configured to generate an interactive thumbnail 340 for transferring content. In-situ document transfer unit 300 includes a thumbnail generator 312, a data transfer controller 314, a destination selector 316, and a data copier 318. In operation, thumbnail generator 312 can be configured to convert presentation data 310 representing a destination (or a source) electronic document into a reduced image as interactive thumbnail 340. For example, thumbnail generator 312 can operate to render non-editable portions with, for instance, a reduced number of pixels, or render editable portions with smaller font sizes, for instance. Interactive thumbnail 340 can be configured to include input fields with which a user can interact to store content in relation to the destination electronic document. Destination selector 316 can be configured to select a specific destination electronic document for pasting content. In one embodiment, destination selector 316 is a module of executable instructions to implement at least a portion of a specialized "Copy-Paste to DOCUMENT" command. In another embodiment, destination selector 316 is implemented as a menu item selector 320 that is configured to invoke the "Copy-Paste to DOCUMENT" command responsive to user inputs from, for example, a pointing device to move a pointer cursor over a respective menu item. Data copier 318 can be configured to copy selected content (e.g., as selected by the user) from a source electronic document to memory locations associated with a destination electronic document. Data transfer controller 314 can be configured to coordinate the functionalities of, and the interactions among, thumbnail generator 312, destination selector 316, and data copier 318. In a specific embodiment, in-situ document transfer unit 300 can be configured to generate a thumbnail for a source electronic document containing content for copying into a destination electronic document, as described next.

Figure 4:
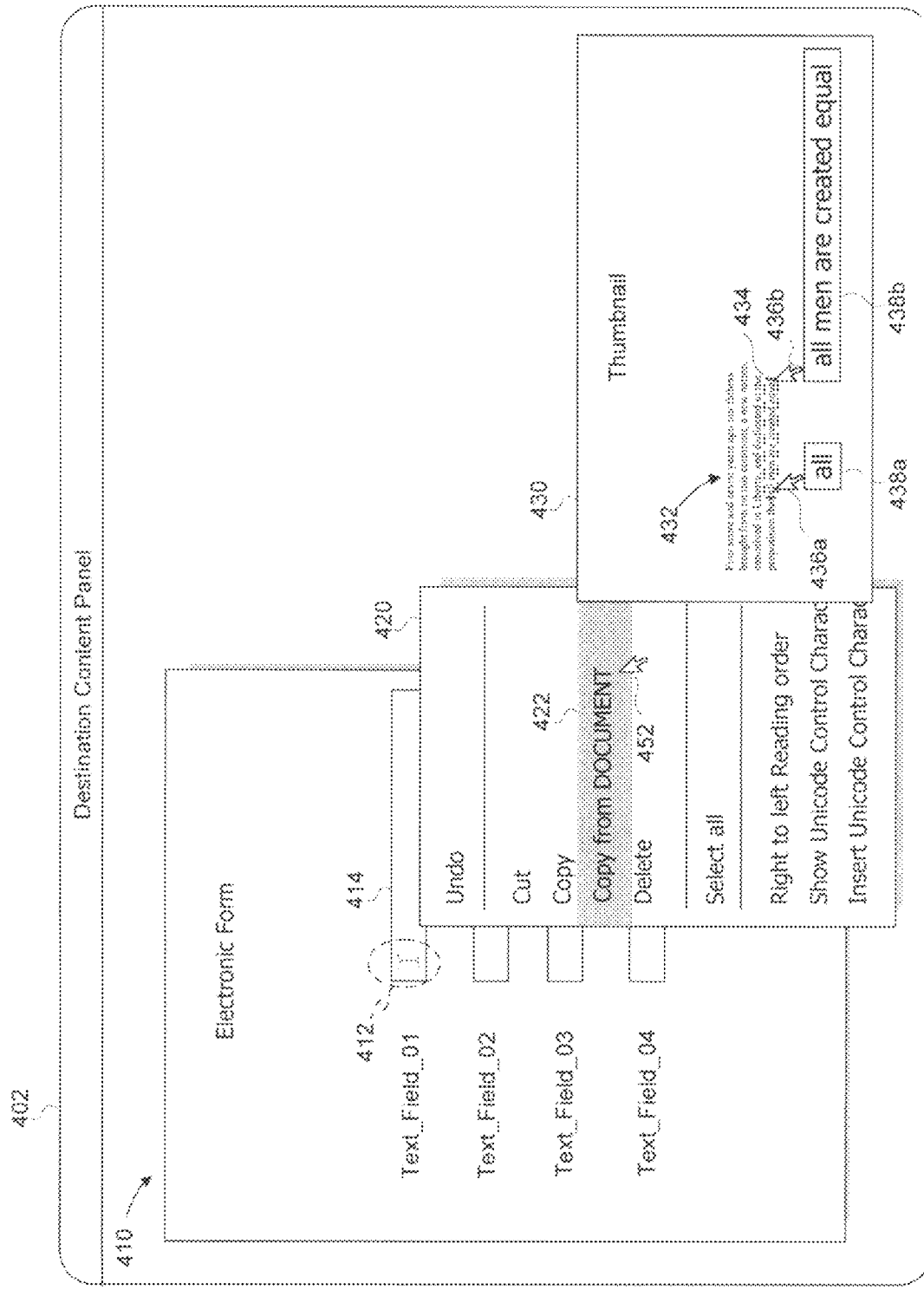
FIG. 4 is an illustration of a reproduction of an electronic document to copy content into a destination electronic document, according to at least one embodiment of the invention.

FIG. 4 is an illustration of a reproduction of an electronic document to copy content into a destination electronic document, according to at least one embodiment of the invention. As shown, a destination content panel 402 includes an electronic form 410 as a destination electronic document. Next, consider that a user causes cursor 412 to select field 414. In one embodiment, cursor 412 is a text cursor, which can be rendered as a blinking vertical line that indicates where new text will be edited when a user starts typing. Selection of cursor 412 can, for example, cause presentation of menu 420, which includes another specialized command (e.g., "Copy from DOCUMENT") for transferring content from a thumbnail 430 into input field 414. When the user moves a pointer cursor 452 over indicia 422, which describes the specialized command, thumbnail 430 can appear. In this example, thumbnail contains source content 432 from which to copy content portion 434. In one embodiment, a user moves pointer cursor 436a to select the beginning of content portion 434. Then, the user can move pointer cursor 436a, which is shown as pointer cursor 436b, to select the entire content portion 434. Subsequently, the specialized command "Copy from DOCUMENT" can operate to paste content portion 436b into input field 414. In one embodiment, information boxes 438a and 438b can be implemented—as tool tips—to enlarge content so that the user can readily view content portion 434. In a specific embodiment, a thumbnail generator (not shown) is configured to strip out all formatting and graphics to present a user with unformatted text, much like a text editor (e.g., limited to ASCII characters), to effectuate copying and pasting.

Figure 5:
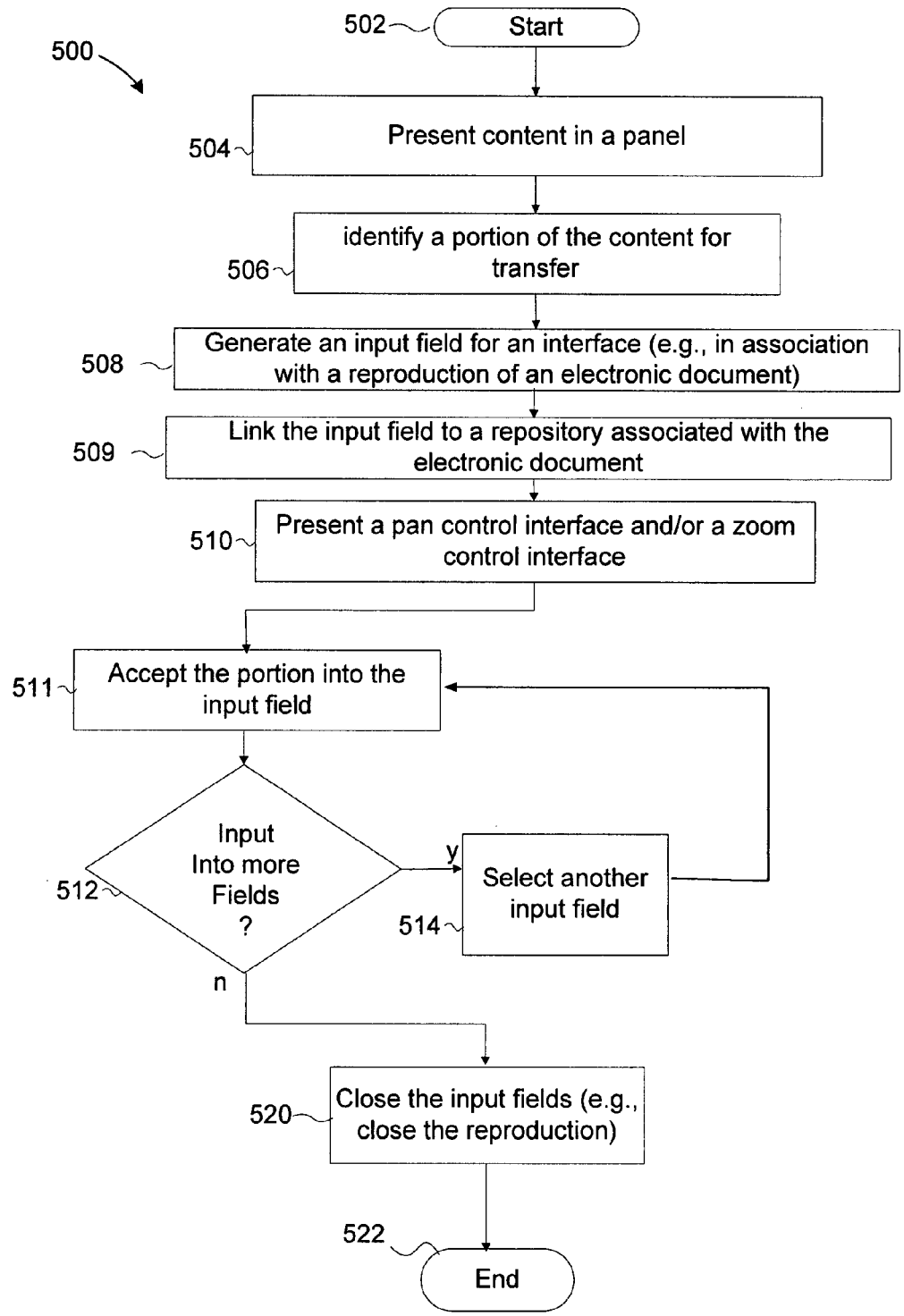
FIG. 5 is a flow diagram depicting one example of a method for transferring content among, for example, electronic documents, according to one embodiment of the invention.

FIG. 5 is a flow diagram depicting one example of a method for transferring content among, for example, electronic documents, according to one embodiment of the invention. As shown, flow 500 begins at 502, with an interface, a processor, an application and/or logic, presenting content at 504 in a panel of which a portion can be identified at 506 for transfer into a destination, such as an electronic document. Flow 500 generates an input field at 508 within, for example, the panel presenting the content. In one embodiment, flow 500 generates a reproduction of the electronic document. At 509, the input field is linked to a repository associated with the electronic document for storing content input by way of the input field (of the reproduction) into the (actual) electronic document (or memory locations associated therewith). Optionally, at 510, either a pan control interface or a zoom control interface, or both, can provide for pan control and zoom control to enable a user to navigate a reproduction and modify the appearance thereof. Flow 500 accepts the portion of content into the input field at 511, and determines whether any additional input fields will be populated with portions of the content at 512. If so, flow 500 continues to 514 at which another input field can be selected. If not, then flow 500 continues to 520 at which the input field(s) and/or reproduction close. Flow 500 terminates at 522.

Figure 6:
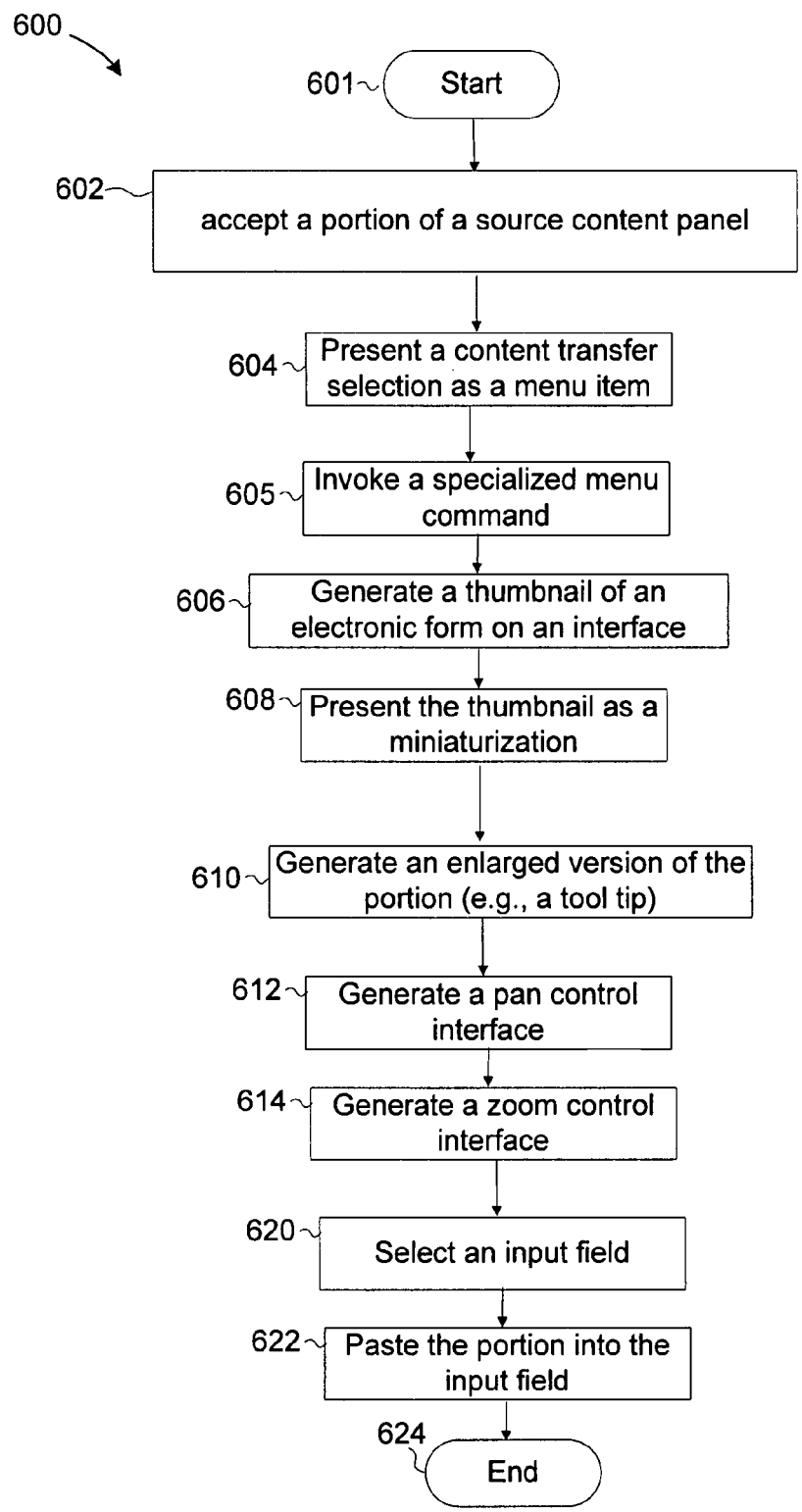
FIG. 6 is a flow diagram depicting another example of a method for transferring content, according to another embodiment of the invention.

FIG. 6 is a flow diagram depicting another example of a method for transferring content, according to another embodiment of the invention. As shown, flow 600 begins at 601, with an interface, a processor, an application and/or logic, accepting a portion of a source content panel at 602. At 604, flow 600 presents selections, for example, in a menu that includes a selection for effecting content transfer via an interactive thumbnail (i.e., a thumbnail including input fields). Upon detecting the selection for effecting content transfer, a specialized command is invoked at 605. In one example, the specialized command is a "Copy-Paste in DOCUMENT" command that, when executed, initiates a copying operation to copy the portion of the source content panel, and determines the destination, such as a destination electronic document, for receiving the portion of the source content panel. At 606, an interactive thumbnail of the destination electronic document is generated, which is followed by the presentation of the interactive thumbnail at 608 as a miniaturization of the destination electronic document.

In some cases, flow 600 can perform one or more of the following: generate an enlarged version of the portion of the source content panel at 610 (e.g., in connection with a tool tip), generate a pan control interface at 612, and generate a zoom control interface at 614. Optionally, the specialized command can also cause the pasting the portion of the source content panel in the input field for the destination electronic document. For example, the pasting of the portion of the source content panel in the input field at 622 can be effectuated by a user causing a pointer cursor to hover over a target input field at 620 of the interactive thumbnail. Flow 600 terminates at 624.

Figure 7A:
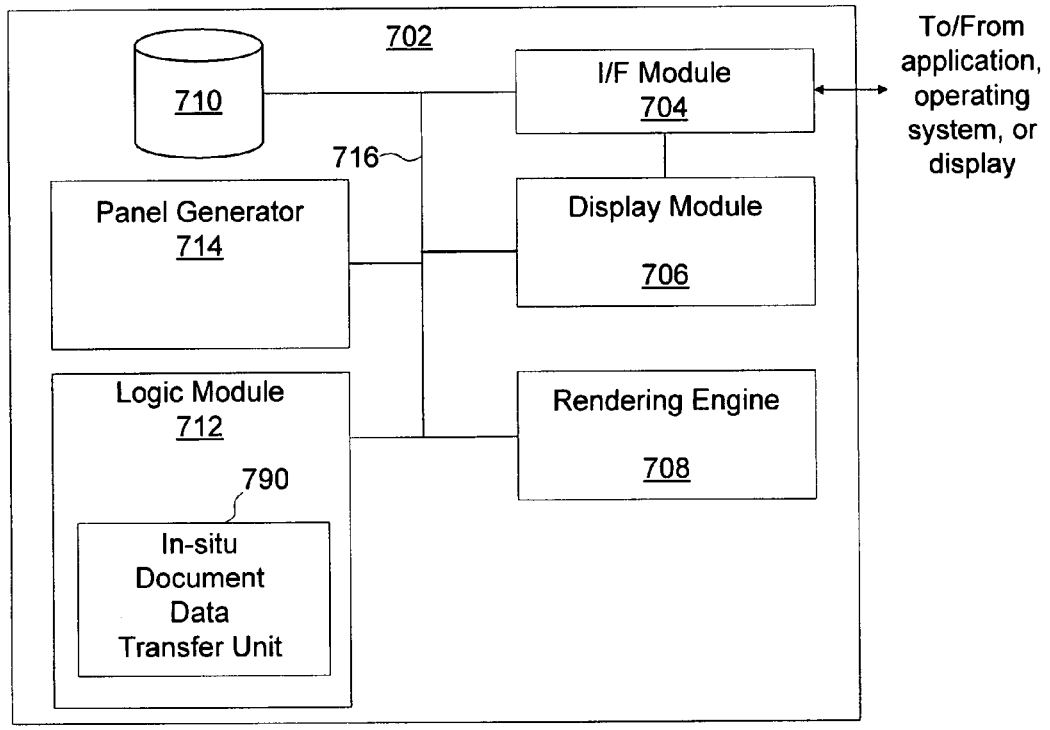
FIG. 7A illustrates an example of a panel presentation application for implementing a source content panel that includes a reproduction, such as an interactive thumbnail, according to various embodiments of the invention.

FIG. 7A illustrates an example of a panel presentation application for implementing a source content panel that includes a reproduction, such as an interactive thumbnail, according to various embodiments of the invention. In at least one embodiment, a source content panel and an interactive thumbnail can be implemented in a panel, such as a single panel. Here, application 702 includes interface ("I/F") module 704, display module 706, rendering engine 708, repository 710, logic module 712, panel generator 714, and data bus 716. In some examples, the number and type of elements shown and described may be varied and are not limited to the descriptions provided. In some examples, the above-described elements can be implemented as part, component, or module of application 702. As an example, application 702 can be implemented to include either a specialized command for performing a consolidated copy-paste function, or an interactive thumbnail, or both, having functionalities as described herein. Logic module 712 can be implemented as software, hardware, circuitry, or a combination thereof to implement control logic for the described techniques for panel presentation.

Figure 9:
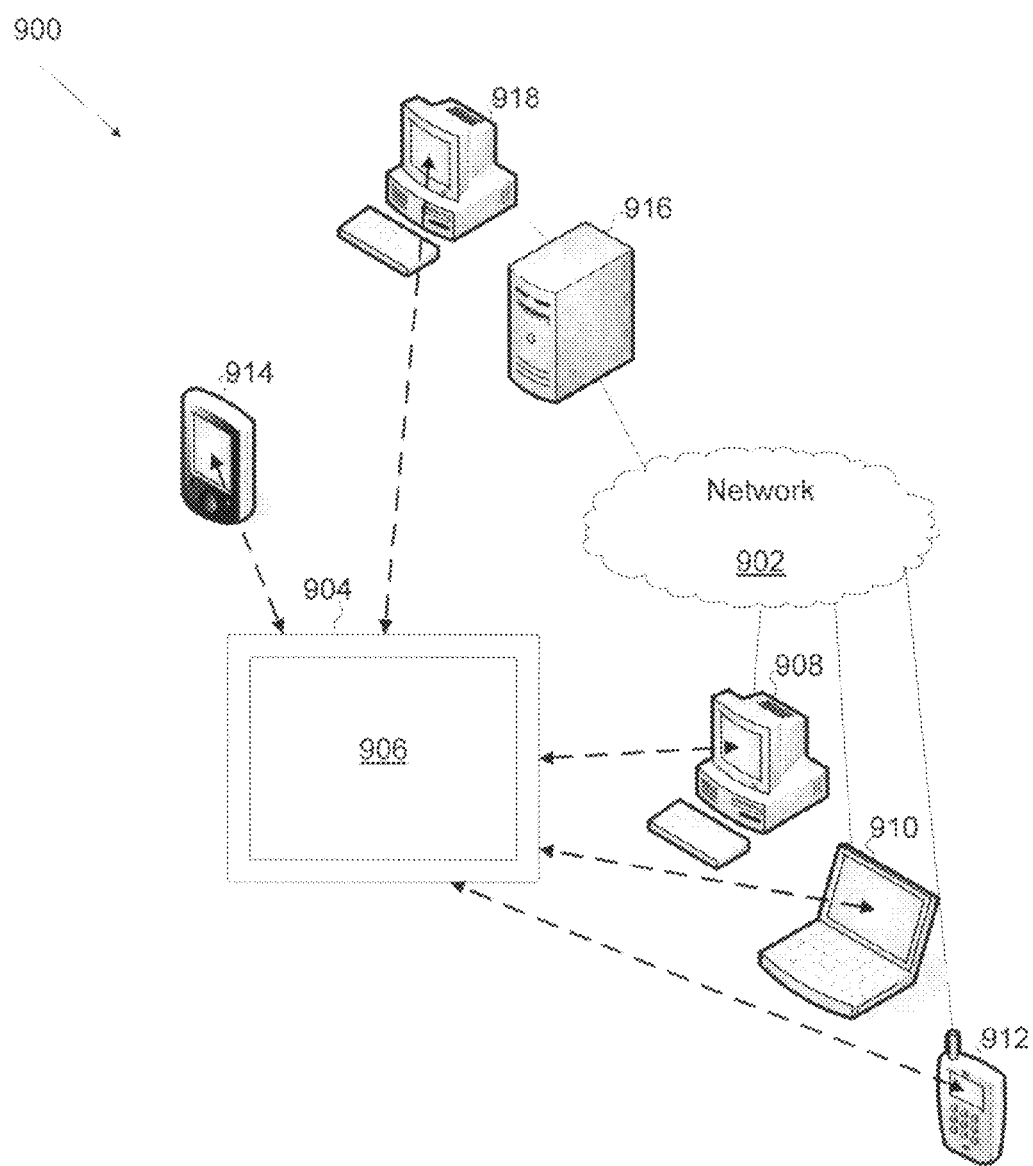
FIG. 9 illustrates an example of a panel presentation system for performing thumbnail-based copy and pasting functions, according to various embodiment of the invention.

In some examples, logic module 712 can be configured to control panel generator 714 to form source content panels that are configured to transfer content via an interactive thumbnail. Rendering engine 708 can be configured to operate as a layout engine for web pages, for example, to manipulate both content (e.g., as expressed in or including HTML, XML, image files, etc.) and formatting information (e.g., as expressed in or including CSS, XSL, etc.) for rendering the data or information as one or more panels on interface 906 (FIG. 9). Interface module 704 can exchange panel presentation data, including content data, image data, audio data, as well as other data, between application 702 and another application (e.g., a host, client, web services-based, distributed (i.e., enterprise), application programming interface ("API"), operating system, program, procedure or others) that can use data and information generated from panel generator 714 to render presented panels on a display screen. In other examples, the above-described techniques and elements can be varied in design, implementation, and function and are not limited to the descriptions provided. In one embodiment, logic module 712 can include an in-situ document transfer unit 790 that is configured to include structure and/or functionality similar to previously-described in-situ document transfer units.

Figure 7B:
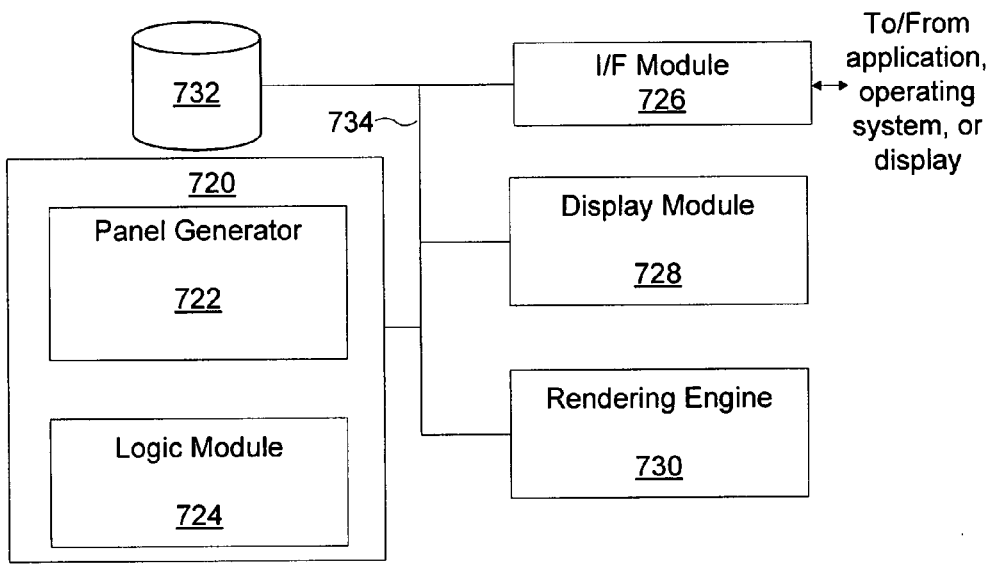
FIG. 7B illustrates an alternative example of a panel presentation application for implementing an in-situ document transfer unit to generate an interactive thumbnail, according to one embodiment of the invention.

FIG. 7B illustrates an alternative example of a panel presentation application for implementing an in-situ document transfer unit to generate an interactive thumbnail, according to one embodiment of the invention. Here, application 720 includes panel generator 722 and logic module 724, which can have equivalent functionality as 712 of FIG. 7A. Further, application 720 is shown in data communication with interface ("I/F") module 726, display module 728, rendering engine 730, and repository 732. Data bus 734 can be configured to send or receive data among application 720, I/F module 726, display module 728, rendering engine 730, and repository 732. In other examples, more, fewer or different elements can be used and implemented without limitation to the examples provided above.

In some examples, logic module 724 and panel generator 722 can be implemented as part of application 720, which can be implemented separately from other functional components or modules, such as interface module 726, display module 728, rendering module 730, and repository 732. Data bus 734 can be implemented to communicate data over a given port between application 720 and interface module 726, display module 728, rendering module 730, and repository 732. In some instances, application 720 can be implemented as a standalone application or as a component (i.e., module) of another application. Data or information (e.g., content portions accepted by input fields of an interactive thumbnail, data for generating a thumbnail, displacement amounts for pan control, zoom in and out amounts, memory locations for storing content in association with an electronic document, and the like) associated with a panel can be stored in repository 732, which can be implemented using a database, data store, data warehouse, or any other type of data repository or structure. In other examples, more, fewer, or different modules can be used to implement the described techniques for panel presentation and are not limited to those provided.

Figure 8:
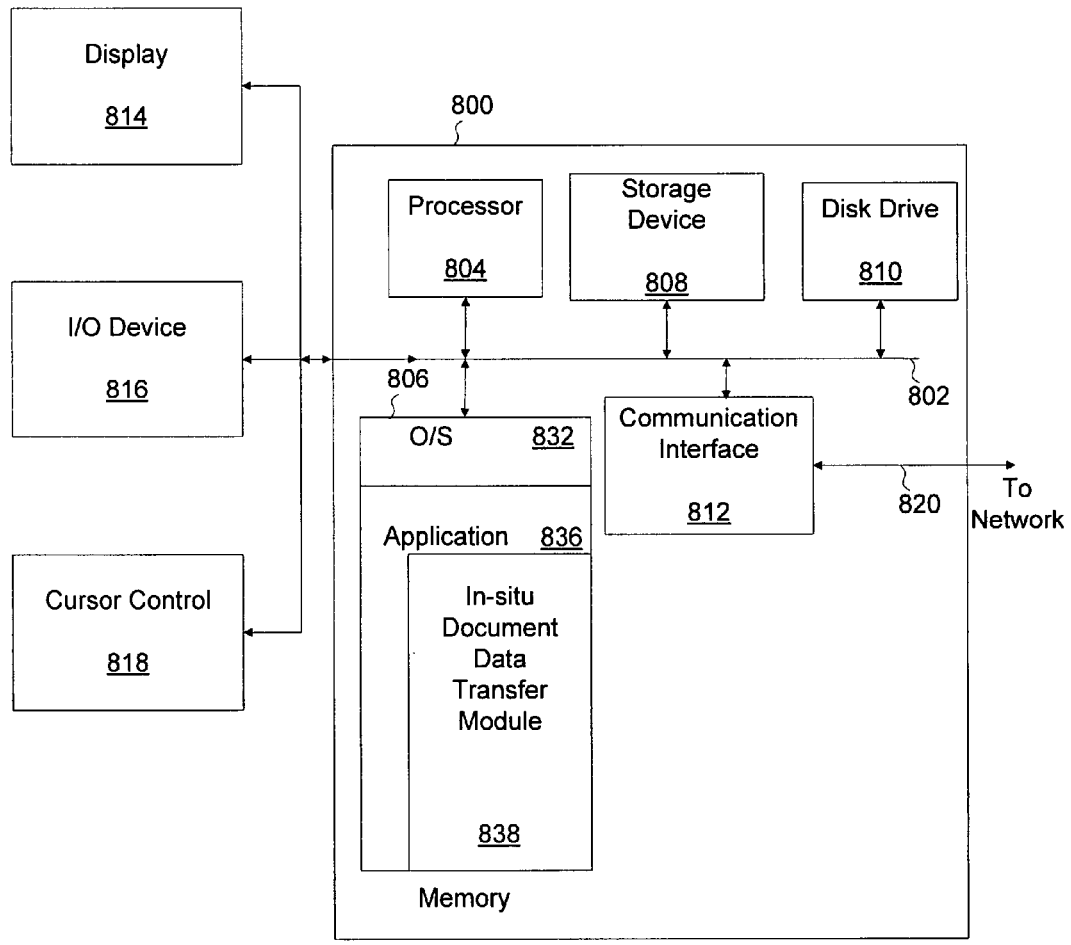
FIG. 8 illustrates an exemplary computer system suitable for implementing an interactive thumbnail for an interface to provide for a consolidated copy and paste function, according to at least one embodiment of the invention.

FIG. 8 illustrates an exemplary computer system suitable for implementing an interactive thumbnail for an interface to provide for a consolidated copy and paste function, according to at least one embodiment of the invention. In some examples, computer system 800 can be used to implement computer programs, applications, methods, processes, or other software to perform the above-described techniques and to realize the structures described herein. Computer system 800 includes a bus 802 or other communication mechanism for communicating information, which interconnects subsystems and devices, such as processor 804, system memory ("memory") 806, storage device 808 (e.g., ROM), disk drive 810 (e.g., magnetic or optical), communication interface 812 (e.g., modem or Ethernet card), display 814 (e.g., CRT or LCD), input device 816 (e.g., keyboard), and pointer cursor control 818 (e.g., mouse or trackball). In one embodiment, pointer cursor control 818 can select a portion of content to copy and paste, whereby both cursor control 818 can be implemented to invoke a specialized command that, at least in part, presents a reproduction of a destination electronic document with editable input fields.

According to some examples, computer system 800 performs specific operations in which processor 804 executes one or more sequences of one or more instructions stored in system memory 806. Such instructions can be read into system memory 806 from another computer readable medium, such as static storage device 808 or disk drive 810. In some examples, hard-wired circuitry can be used in place of or in combination with software instructions for implementation.

In the example shown, system memory 806 includes modules of executable instructions for implementing an operation system ("O/S") 832, an application 836, and an in-situ document data transfer module 838. Application 836 includes additional instructions to integrate the implementation of a specialized content transfer command and/or an interactive thumbnail provided by in-situ document data transfer module 838.

The term "computer readable medium" refers, at least in one embodiment, to any medium that participates in providing instructions to processor 804 for execution. Such a medium can take many forms, including but not limited to, non-volatile media, volatile media, and transmission media. Non-volatile media includes, for example, optical or magnetic disks, such as disk drive 810. Volatile media includes dynamic memory, such as system memory 806. Transmission media includes coaxial cables, copper wire, and fiber optics, including wires that comprise bus 802. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions can be performed by a single computer system 800. According to some examples, two or more computer systems 800 coupled by communication link 820 (e.g., LAN, PSTN, or wireless network) can perform the sequence of instructions in coordination with one another. Computer system 800 can transmit and receive messages, data, and instructions, including program, i.e., application code, through communication link 820 and communication interface 812. Received program code can be executed by processor 804 as it is received, and/or stored in disk drive 810, or other non-volatile storage for later execution. In one embodiment, system 800 is implemented as a hand-held device, such as a mobile phone 850. But in other embodiments, system 800 can be implemented as a personal computer (i.e., a desk top computer) or any other computing device.

FIG. 9 illustrates an example of a panel presentation system for performing thumbnail-based copy-and-paste functions, according to various embodiment of the invention. Here, system 900 includes network 902, display environment 904, interface 906, which can be presented on devices such as computer 908, notebook computer ("notebook" or "laptop") 910, smart phone 912, personal digital assistant ("PDA") 914, server 916, and administrator computer 918. In other examples, the number and type of devices can be varied and are not limited to those shown and described.

In some examples, one or more panels for creating electronic documents can be presented on interface 906, which can be an interface for an application such as a web browsing program, Internet content portal, client or desktop application for any purpose. Panels can be used to provide additional or supplemental information that can be contextually relevant to another panel presented in interface 906. Computer 908, notebook computer ("notebook" or "laptop") 910, smart phone 912, personal digital assistant ("PDA") 914, server 916, and administrator computer 918 can provide content data for rendering content as well as other data, which can be implemented to generate, for example, an electronic form and content input field in interface 906. In some cases, an operating system installed on computer 908 can communicate (i.e., via an application programming interface ("API")) content data and/or other related data to another application installed on computer 908 to render (i.e., interpreting data and information to draw or display the content in an interface) one or more panels presented in interface 906. In some examples, different types of panels can be rendered in interface 906. In one embodiment, interface 906 can include any number and/or any type of display environments, such as CRT and LCD displays. Note that the above-described system and elements can be varied and are not limited to the descriptions or examples provided.

In at least some of the embodiments of the invention, the structures and/or functions of any of the above-described interfaces and panels can be implemented in software, hardware, firmware, circuitry, or a combination thereof. Note that the structures and constituent elements shown in FIGS. 7A to 9, as well as their functionality, can be aggregated with one or more other structures or elements. Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention.

What is claimed:

1. A non-transitory computer readable volatile or non-volatile storage medium storing program instructions executable to:
   present a first electronic document in a panel;
   receive an identification of at least a portion of the first electronic document to transfer into a second electronic document, wherein the second electronic document is not currently presented in the panel;
   generate an interactive, reduced size representation of the second electronic document in situ with the first electronic document within the panel, wherein at least a portion of the interactive, reduced size representation of the second electronic document is linked to a repository for the second electronic document;
   receive selection of the interactive, reduced size representation of the second electronic document to paste a copy of the portion of the first electronic document into the second electronic document; and
   paste the copy of the portion of the first electronic document into the second electronic document while remaining in context of the first electronic document and without transitioning to the second electronic document;
   wherein to paste the copy of the portion of the first electronic document into the second electronic document, the program instructions are further executable to automatically store, in response to said paste, the copy to the repository linked by the interactive, reduced size representation of the second document such that the pasted copy will be automatically present in the second electronic document when the second electronic document is opened.

2. The non-transitory computer readable medium of claim 1 wherein the program instructions are further executable to:
   store the portion in the repository for the second electronic document without transitioning to another panel.

3. The non-transitory computer readable medium of claim 1 wherein the program instructions are further executable to:
   store the portion in the repository for the second electronic document without opening an application for the second electronic document.

4. The non-transitory computer readable medium of claim 1 wherein the program instructions are further executable to:
   in response to user input select the interactive, reduced size representation of the second electronic document in situ with the first electronic document; and
   identify a memory location in the repository corresponding to the interactive, reduced size representation.

5. The non-transitory computer readable medium of claim 1 wherein said generate an interactive, reduced size representation of the second electronic document in situ with the first electronic document comprises display a reproduction of the second electronic document within the panel, wherein the reproduction comprises an input field.

6. The non-transitory computer readable medium of claim 5 wherein the program instructions are executable to: reduce the size of the reproduction of the second electronic document.

7. The non-transitory computer readable medium of claim 5, wherein said paste a copy of the portion is performed in response to user input selecting the input field, and wherein the program instructions are further executable to:
   refresh the reproduction to display the input field containing a copy of the portion.

8. The non-transitory computer readable medium of claim 7 wherein display the input field containing a copy of the portion comprises enlarging the copy of the portion.

9. The non-transitory computer readable medium of claim 5 wherein the reproduction of the second electronic document comprises an image.

10. The non-transitory computer readable medium of claim 9 wherein the image is non-editable and the input field is editable.

11. The non-transitory computer readable medium of claim 5 wherein display a reproduction of the second electronic document comprises display a pan control interface.

12. The non-transitory computer readable medium of claim 5 wherein display a reproduction of the second electronic document comprises display a zoom control interface.

13. The non-transitory computer readable medium of claim 1 wherein the representation comprises a text field.

14. A non-transitory computer readable volatile or non-volatile medium storing program instructions executable to:
receive user input identifying a portion of content in a first panel to form a selected content portion;
invoke a specialized command to display an interactive thumbnail of an electronic document in situ with the content within the first panel, wherein the interactive thumbnail is selectable to paste the selected content portion into the electronic document while remaining in context of the content in the first panel and without transitioning to the electronic document, and wherein the electronic document is not currently displayed in the first panel; and
wherein to paste the selected content portion, the program instructions are further executable to automatically store, as part of the specialized command, the selected content portion to the electronic document represented by the interactive thumbnail while remaining in the context of the content in the first panel and without transitioning to the electronic document.

15. The non-transitory computer readable medium of claim 14 wherein the specialized command comprises copy the selected content portion; and
identify the electronic document.

16. The non-transitory computer readable medium of claim 15 wherein to paste the selected content portion into the electronic document, the program instructions are further executable to:
receive user input identifying a location in the interactive thumbnail; and
paste the selected content portion in the electronic document at a location in the electronic document corresponding to the identified location in the interactive thumbnail while remaining in context of the content in the first panel and without transitioning to the electronic document.

17. The non-transitory computer readable medium of claim 16 wherein paste the selected content portion is performed in response to identifying the location.

18. A non-transitory computer readable volatile or non-volatile medium storing program instructions executable to:
receive user input identifying a portion of a source content panel;
display a thumbnail of an electronic form in situ in the source content panel, wherein the electronic form is not currently displayed in the panel and wherein the thumbnail includes one or more input fields selectable to paste a copy of the portion of the source content panel into the electronic form while remaining in context of the source content panel without transitioning to the electronic form; and
paste the portion into a field of the electronic form corresponding to a selected one of the one or more input fields while remaining in context of the source content panel without transitioning to the electronic form.

19. The non-transitory computer readable medium of claim 18 wherein the thumbnail of the electronic form is a miniaturization of the electronic form.

20. The non-transitory computer readable medium of claim 18 wherein the program instructions are further executable to:
present a menu including a selection to paste the portion into one of the one or more input fields; and
receive user input identifying a particular one of the one or more input fields.

21. The non-transitory computer readable medium of claim 20 wherein identifying a particular one of the one or more input fields comprises hovering a pointer cursor over the particular one of the one or more input fields.

22. The non-transitory computer readable medium of claim 20 wherein the program instructions are further executable to:
generate a tool tip presenting an enlarged display of the portion.

23. The non-transitory computer readable medium of claim 18 wherein the program instructions are further executable to:
generate a pan control interface for presenting different portions of the electronic form within a thumbnail boundary; and
generate a zoom control interface for modifying the size of the electronic form within the thumbnail boundary.

24. A device comprising:
a processor;
a memory storing instructions and data executable by the processor to implement:
a panel generator configured to generate a panel including a first electronic document; and an in-situ document data transfer unit comprising:
a thumbnail generator configured to:
convert presentation data representing a second electronic document into an interactive thumbnail and display the interactive thumbnail in situ with the first electronic document; and
a data copier configured to:
transfer selected data via the interactive thumbnail from the first electronic document to the second electronic document, wherein selection of the data to transfer and said transfer occur while remaining in context of the first electronic document without transitioning to the second electronic document, wherein the first electronic document is a source electronic document for the transfer, and the second electronic document is a destination electronic document for the transfer.

25. A system, comprising:
a memory configured to store instructions and data associated with transferring data from an opened electronic document to an unopened electronic document; and
logic configured to:
present a first electronic document as the opened electronic document in a panel;
identify at least a portion of the first electronic document to transfer into a second electronic document, wherein the second electronic document is not presented in the panel;
generate an interactive, reduced size representation of the second electronic document in situ with the opened electronic document within the panel wherein at least a portion of the interactive, reduced size representation of the second electronic document is linked to a repository for the second electronic document; and
paste a copy of the portion of the first electronic document into the second electronic document while remaining in context of the opened first electronic document and without transitioning to the second electronic document;

wherein to paste the copy of the portion of the first electronic document into the second electronic document, the logic is further configured to automatically store, in response to said paste, the copy to the repository linked by the interactive, reduced size representation of the second electronic document such that the pasted copy will be automatically present in the second electronic document when the second electronic document is opened.

26. A system, comprising:
a processor;
a memory storing instructions and data executable by the processor to implement:
  receiving user input identifying a portion of a source content panel;
  in response to said receiving, display a thumbnail representation of an electronic form in situ in the source content panel, wherein the electronic form is not currently displayed in the panel and wherein the electronic form comprises one or more input fields selectable to paste a copy of the portion of the source content panel into the electronic form while remaining in context of the source content panel without transitioning to the electronic form; and
  paste the portion into a field of the electronic form corresponding to a selected one of the one or more input fields while remaining in context of the source content panel without transitioning to the electronic form.

27. A method, comprising:
presenting a first electronic document in a panel;
receiving an identification of at least a portion of the first electronic document to transfer into a second electronic document, wherein the second electronic document is not presented in the panel;
generating an interactive, reduced size representation of the second electronic document in situ with the first electronic document within the panel, wherein at least a portion of the interactive, reduced size representation of the second electronic document is linked to a repository for the second electronic document; and
pasting a copy of the portion of the first electronic document into the second electronic document while remaining in context of the first electronic document and without transitioning to the second electronic document;
wherein said pasting comprises automatically storing the copy to the repository linked by the interactive, reduced size representation of the second document such that the pasted copy will be automatically present in the second electronic document when the second electronic document is opened.

28. The method of claim 27 wherein the representation is a reproduction of the second electronic document.

29. A method, comprising:
receiving user input identifying a portion of a source content panel;
displaying a thumbnail of an electronic form in situ in the source content panel, wherein the electronic form is not currently displayed in the source content panel, and wherein the thumbnail comprises one or more input fields selectable to paste a copy of the portion of the source content panel into the electronic form while remaining in context of the source content panel without transitioning to the electronic form; and
pasting the portion into a field of the electronic form corresponding to a selected one of the one or more input fields while remaining in context of the source content panel without transitioning to the electronic form.

30. The method of claim 29 wherein displaying a thumbnail comprises presenting a miniaturization of the electronic form.

31. The method of claim 29 further comprising:
presenting a menu including a selection to paste the portion into a particular one of the one or more input fields; and
accepting a selection of a particular one of the one or more input fields into which the portion is to be pasted.

* * * * *